United States Patent [19]
Zuckerman

[11] 3,871,954
[45] Mar. 18, 1975

[54] CELL LINES AND VIRUS CULTURE
[75] Inventor: Arie Jeremy Zuckerman, London, England
[73] Assignee: National Research Development Corporation, London, England
[22] Filed: Jan. 4, 1974
[21] Appl. No.: 430,918

Related U.S. Application Data
[63] Continuation of Ser. No. 62,607, Aug. 10, 1970, abandoned.

[30] Foreign Application Priority Data
Aug. 22, 1969 United Kingdom............ 42062/69

[52] U.S. Cl...................... 195/1.1, 195/1.8, 424/89
[51] Int. Cl............................................. C12k 9/00
[58] Field of Search ................ 195/1.1, 1.8; 424/89

[56] References Cited
UNITED STATES PATENTS

| 3,397,267 | 8/1968 | Fernandes et al. | 424/89 |
|---|---|---|---|
| 3,450,598 | 6/1969 | Walsh et al. | 195/1.8 |
| 3,520,972 | 6/1970 | Smith et al. | 424/89 |
| 3,544,680 | 12/1970 | Plotkin | 424/89 |
| 3,616,203 | 10/1971 | Brown | 195/1.8 |

OTHER PUBLICATIONS
Hayflick et al. Experimental Coil Research 25:585–621 (1961) "The Serial Cultivation of Human Diploid Cell Strains" Flow Labs. Inc. Catalog May 1967 11 pages.
Chang P.S.E.B.M. 87:440–443 (1954) "Continuous Subcultivation of Epitholia–like Cells From Normal Human Tissues"
Syverton et al. Cancer Res. 17:923–926 (1957) Human Cells in Continuous Culture I. Derivatives of Cell Strains From...Liver"

Primary Examiner—Shep K. Rose
Attorney, Agent, or Firm—Cushman, Darby & Cushman

[57] ABSTRACT

A method for producing a human embryo liver cell line which comprises disaggregating human embryo liver, suspending the cells in a growth medium, replacing this with fresh medium if it becomes acid, and allowing a confluent sheet of spindle-shaped cells of the cell line to form. The cells of the cell line, which are designated by A.T.C.C. No. CL99, may be subcultured and may be used as the basis of a cell-culture system for the culturing of mammalian cells in tissue culture. Viruses may be cultivated in a culture system based on cells of the cell line to provide antigenic material for the preparation of vaccines.

4 Claims, No Drawings

CELL LINES AND VIRUS CULTURE

This is a continuation of application Ser. No. 62,607 filed Aug. 10, 1970, and now abandoned.

This invention relates to the preparation of cell lines, to the cultivation of viruses therein, and to vaccines containing such viruses.

In view of the difficulties attendant upon the use of primary cultures for the cultivation of viruses, as well as the high cost of such cultures and their limited susceptibility, the development of new cell lines for use in medical research and vaccine production is the subject of extensive investigation. Many cell lines have been discovered, but relatively few are acceptable for use other than in research because of their tendency to instability and the development of undesirable characteristics.

It has now been found possible by the employment of a carefully controlled technique to produce a new cell line from human embryo liver which can be cultured serially and has the advantage of being a diploid strain.

According to this invention a human embryo liver cell line is produced by disaggregating human embryo liver, suspending the cells in a growth medium, replacing this with fresh medium if it becomes acid, and allowing a confluent sheet of spindle-shaped cells of the cell line to form.

The liver cells to be cultured are first disaggregated. One suitable method of doing this is by trypsinisation, treatment with trypsin solution preferably being carried out at about 20°C and in two or three cycles of trypsinisation. The trypsin may then be inactivated, e.g., by the addition of heat-inactivated foetal calf serum, and the cell suspension washed twice in the growth medium using light centrifugation at lowered temperatures.

The cells are then cultured in a growth medium, a preferred basis for this being Eagle's minimum essential medium, conveniently in combination with from about 10 to about 15 percent of heat inactivated foetal calf serum and incorporating various additives. The preferred method of culture of the suspension of cells (mixed population) in the growth medium is to place aliquots of the suspension in Leighton tubes with a cover slip and to incubate at about 35°C. The growth medium is preferably changed when the pH of the medium becomes acid, which is usually every 3 to 4 days. Usually a period of 5 to 7 days is sufficient to form the confluent sheet of the new cell line and during this time other cells originally present fail to survive.

By following the process with care it is possible to obtain, in a reproducible manner, the new cell line which has been deposited with the Medical Research Council's Division of Immunological Products Control, Hampstead, London and with A.T.C.C. as No. CL99. The cell line has the following characteristics:-

1. It forms monolayers of spindle-shaped cells, which may be sub-cultured and passaged a number of times. A collagen substrate is not required.
2. No hepatocytes nor cells derived from the haemopoietic series are present.
3. The cells can be shown by electron microscopy not to be fibroblasts.
4. The karyology of the cells shows them to be diploid.
5. The cell suspension may be stored in liquid nitrogen.

The invention also includes a cell culture system comprising cells of the human embryo cell line in a nutrient medium suitable for the culturing or maintenance of mammalian cells in tissue culture.

It is possible to employ the new cell line for the cultivation of a wide variety of viruses including adenoviruses, for example types 2, 3, 4, 5, 7 and 17, San Carlos viruses, for example types 3, 6, 8 and 49, ECHO viruses, for example type 11, Anthropodborne Group A viruses, for example Sindbis virus, pox viruses, for example vaccinia virus, myxoviruses and paramyxoviruses, for example influenze viruses such as the influenza A2 virus (strain A2/Singapore/1/57), picornaviruses, for example poliomyelitis viruses such as Sabin poliovirus type 1, and the AR-17 haemovirus (isolated by Parke Davis and Co.). In addition, the use of the cell line for replication of Arboviruses and some other RNA viruses, and also members of the Herpes virus group and other DNA viruses is envisaged. Thus, human serum obtained from volunteers and known to contain infectious MS1 hepatitis virus has been inoculated on to a culture system comprising cells of the cell line and results indicate the production of a cytopathic effect in an analogous manner to the cytopathic effect produced by the AR-17 haemovirus which can be cultured in this system. The use of the new cell line for the cultivation of this and other strains of hepatitis viruses is therefore envisaged in accordance with this invention and offers particular attraction in view of the hitherto unrewarding search for suitable cells in which to culture these viruses.

Thus it will be seen that the present invention further includes a virus cultivation process which comprises maintaining a viable culture of cells derived from the human embryo liver cell line in a nutrient culture medium, inoculating the culture with a virus to which the cells are susceptible and cultivating the virus in the culture. The cells may be cultured in any convenient way and the nutrient medium used for the growth of many viruses may conveniently be the same as the medium hereinbefore described for the growth of the cell line. Other viruses, however, may require a different nutrient medium for satisfactory growth.

It will be appreciated that the production of vaccines is also within the scope of the invention. In order to produce corresponding vaccines from viruses cultivated by the present invention, it is necessary to further process the viruses by methods known per se. Thus a virus may be cultivated to give an antigenic end product which may be incorporated in an administrable form and dosage into a vaccine and which may also be used to produce antibodies for passive immunisation. Virus grown on the new cell line may be used to provide live, killed or attenuated vaccines depending on the nature of the virus itself. The vaccines may be formulated in various media isotonic saline commonly being used, on occasion in combination with various additives, for example buffering agents. The vaccines may be administered by various parenteral routes, for example intravenously, intramuscularly and subcutaneously.

The invention is illustrated by the following Examples.

EXAMPLE 1: PRODUCTION OF THE CELL LINE

Human embryo livers obtained from foetuses aged 10 to 22 weeks removed by abdominal hysterotomy are treated with a 0.2 percent trypsin solution at a temperature of 20°C for twenty minutes. 2 - 3 Cycles of trypsinisation are carried out. The trypsin is inactivated by the addition of heat-inactivated foetal calf serum to yield a final concentration of 20 percent. The cell suspension is washed twice in the growth medium using light centrifugation, 500 to 600 r.p.m., for 5 minutes at 4°C.

The cells (mixed population) are suspended in a growth medium comprising about 85 percent Eagle's minimum essential medium, 15 percent heat-inactivated foetal calf serum, 0.15 percent sodium bicarbonate, 100 units/ml penicillin, 100 μg/ml streptomycin and 25 units/ml Nystatin, and are placed in 2 ml aliquots containing approximately $8 \times 10^5$ cells per ml in Leighton tubes with a cover slip and incubated at 35°C. The growth medium is changed after 3 to 4 days as the pH of the medium becomes acid. After 5 to 7 days a confluent sheet of spindle-shaped cells is obtained in which no hepatocytes nor cells of the haemopoietic series are present.

Electron microscopy indicates that these spindle-shaped cells are not typical fibroblasts. Their karyology shows them to be diploid (with incidences of break, subdiploid and polyploid figures which are acceptable for diploid cells, although the subdiploidy results tend to be somewhat high)

Cell suspensions may be stored in liquid nitrogen using either dimethylsulphoxide, preferably 20 percent v/v, yielding a final concentration of 10 percent sulphoxide, or 5 to 10 percent glycerol.

EXAMPLE 2: SUB-CULTURE OF THE CELL LINE

The cells are removed from the original culture vessel, where they adhere firmly to the glass, by disaggregation, for example by the use of trypsin followed by scraping. Thus 1 ml of 0.2 percent trypsin is added to each tube and left at room temperature for about 6 minutes; excess trypsin is poured off and discarded, and 2 ml of a growth medium comprising about 85 percent Eagle's minimum essential medium, 15 percent heat-inactivated foetal calf serum, 0.15 percent sodium bicarbonate, 100 units/ml penicillin, 100 μg/ml streptomycin and 25 units/ml Nystatin are added. The tubes are left at room temperature for a period of about 6 minutes to allow the cell sheet to strip off. Any remaining adhering cells are then scraped off the cover slip with a bent fine glass rod and the resulting cell suspension aspirated with a Pasteur pipette. 1 ml. aliquots of the resulting cell suspension are measured into two fresh tubes and the volume made up with growth medium to 2 ml in each tube. A confluent monolayer is obtained in approximately 2 - 3 days.

On serial cultivation by the manner described the cells typically exhibit a completely normal growth pattern up to the 32nd doubling but beginning with the 33rd subcultivation a phase of senescence is observed characterised by a reduced rate of growth and increased granularity. Typical results for the karyology of the cell line from examination of metaphase plates prepared at various passage levels are shown in Table 1 below and illustrate the retention of the diploid karyotype of the cells on serial culture.

Table 1

| Passage | Polyploidy | Subdiploidy | Chromosomal Breaks | Achromatic Lesions | Total Breaks | Possible Additional Breaks | Other Aberrations |
| --- | --- | --- | --- | --- | --- | --- | --- |
| 15 | 1/287 | 1/42 | 2/50 | 0/50 | 2/50 | 0/100 | 0/100 |
| 17 | 2/268 | 6/32 | 1/100 | 2/100 | 3/100 | 1/100 | 0/100 |
| 23 | 6/314 | 6/27 | 1/50 | 0/50 | 1/50 | 0/50 | 0/50 |

EXAMPLE 3: GENERAL METHOD FOR THE CULTIVATION OF VIRUSES IN CELL LINE

The virus suspension is serially diluted in phosphate-buffered solution using 0.2 ml of either $10^{-2}$ or $10^{-3}$ dilution of the virus suspension for Leighton tubes or tissue culture tubes, and 0.4 ml of either $10^{-2}$ or $10^{-3}$ dilution for 1 oz. medical flasks. The virus is allowed to absorb on the cell sheet for 30 minutes at 35°C and the growth medium, comprising about 85 percent Eagle's minimum essential medium, 15 percent heat-inactivated foetal calf serum, 0.15 percent sodium bicarbonate, 100 units/ml penicillin, 100 μg/ml streptomycin and 25 units/ml. Nystatin is then added. The tubes or flasks are examined daily for cytopathic effect and the virus is harvested when about 75 percent of the cells are affected. The titre of the virus obtained may be in the region of $10^{-6}$ to $10^{-7}$ per ml.

EXAMPLE 4: CULTURE OF AR-17 HAEMOVIRUS IN CELL LINE

Seed AR-17 virus is prepared from infected Detroit 6Y292(558) cells, this material representing the 11th tissue culture transfer of the virus. Six days after inoculation the cultures show marked degeneration at which time they are harvested. Cells and fluid are pooled, then rapidly frozen and thawed three times. Cell debris is removed by centrifugation at 1500 r.p.m. for 10 minutes and the resulting supernatant fluid is stored at −55°C in 1 ml amounts. Seed virus, diluted 1:2 in phosphate buffered saline and inoculated in 0.2 ml amounts on to monolayers of cells of the human embryo liver cell line in 1 oz bottles produces a cytopathic effect 7 − 9 days after inoculation. Virus harvested from primary passage typically has a $TCID_{50}$ value of $10^{-3}$ but cannot be transferred beyond the first passage.

EXAMPLE 5: CULTURE OF SAN CARLOS VIRUS TYPE 3 IN CELL LINE

Seed San Carlos virus 3 is prepared from virus that has had 5 passages in cultured primary human embryo hepatocytes. Cultures are harvested 4 days after inoculation when approximately 75 percent of the cells are affected. Cells and fluid are pooled and treated in the same manner as described for AR-17 virus in Example 4. Titration of this material in primary human embryonic liver cell cultures typically gives a titre of 103.2 $TCID_{50}$ per 0.1 ml.

EXAMPLE 6: TITRATION OF STOCK VIRUSES IN CELL LINE

Titration of a number of stock viruses in the human embryo liver cell line gives end-points similar to those obtained in the human diploid cell strain of lung origin designated WI-38. Results typical of those obtained are given in Table 2 below.

Table 2

| Virus | Titre TCID$_{50}$ (log$_{10}$/ml) | |
|---|---|---|
| | Human embryo liver cell line | WI 38 lung cells |
| ECHO virus type 11 | 8.2 | 8.3 |
| Sabin poliovirus type 1 | 7.1 | 6.7 |
| Adenovirus type 7 | 5.2 | 6.0 |
| Sindbis virus | 6.7 | 6.8 |

I claim:

1. A virus cultivation process which comprises maintaining a viable culture of cells derived from the human embryo liver cell line designated by A.T.C.C. Number CL.99 in a synthetic nutrient culture medium, inoculating the culture with a virus to which the cells are susceptible and cultivating the virus in the culture.

2. A process according to claim 1, wherein the virus is of the group consisting of adenoviruses, San Carlos viruses, ECHO viruses, arthropodborne group A viruses and other arboviruses, pox viruses, myxoviruses, paramyxoviruses, picornaviruses, herpes viruses and the AR 17 haemovirus.

3. A process according to claim 1 wherein the virus is a hepatitus virus.

4. A process according to claim 1 wherein the virus is of the group consisting of adenovirus types 2, 3, 4, 5, 7 and 17, San Carlos virus type 3, 6, 8 and 49, ECHO virus type 11, Sindbus virus, vaccinia virus, influenza A2 virus and other influenza viruses, Sabin poliovirus type 1 and other poliomyelitis viruses, and the AR-17 haemovirus.

* * * * *